United States Patent

Kamiyama et al.

Patent Number: 4,612,118
Date of Patent: Sep. 16, 1986

[54] COMPOSITE SEMIPERMEABLE MEMBRANE OF POLYAMINE AND TRIANZINE

[75] Inventors: Yoshiyasu Kamiyama; Keisuke Nakagome, both of Osaka, Japan

[73] Assignee: Nitto Electric Industrial Co., Ltd., Osaka, Japan

[21] Appl. No.: 616,750

[22] Filed: Jun. 4, 1984

Related U.S. Application Data

[63] Continuation of Ser. No. 362,336, Mar. 26, 1982, abandoned.

[30] Foreign Application Priority Data

Mar. 31, 1981 [JP] Japan ................................. 56-48963

[51] Int. Cl.[4] .............................................. B01D 13/04
[52] U.S. Cl. ................................... 210/490; 210/506; 210/500.33; 210/500.37; 210/500.41
[58] Field of Search .................... 210/490, 500.2, 506; 55/158; 204/296; 429/247

[56] References Cited

U.S. PATENT DOCUMENTS

| | | | |
|---|---|---|---|
| 3,526,588 | 9/1970 | Michaels et al. | 210/500.2 X |
| 3,615,024 | 10/1971 | Michaels | 210/490 |
| 3,951,815 | 4/1976 | Wrasidlo | 528/424 |
| 4,005,012 | 1/1977 | Wrasidlo | 210/500.2 X |
| 4,039,440 | 8/1977 | Cadotte | 210/500.2 X |
| 4,125,462 | 11/1978 | Latty | 210/500.2 X |
| 4,240,914 | 12/1980 | Iwama et al. | 210/500.2 |
| 4,265,745 | 5/1981 | Kawaguchi et al. | 210/500.2 X |

*Primary Examiner*—David Sadowski
*Attorney, Agent, or Firm*—Sughrue, Mion, Zinn, Macpeak and Seas

[57] ABSTRACT

A composite semipermeable membrane which comprises a porous substrate and an ultrathin dense layer having solute removal performance formed on said substrate by polymerization by crosslinking of a reactive material composed of at least one material selected from the group consisting of
(a) a mixture of triazine represented by the general formula:

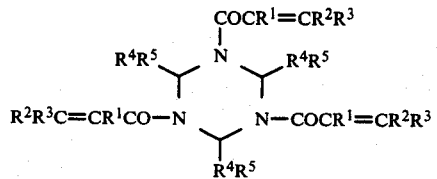

(wherein $R^1$, $R^2$, $R^3$, $R^4$ and $R^5$ each represents a hydrogen atom or an alkyl group having 1 to 5 carbon atoms), and polyamine monomer,
(b) said triazine modified with amine,
(c) a mixture of said triazine modified with amine, and polyamine monomer,
(d) a oligomer composed of said triazine and polyamine monomer, and
(e) a mixture of an oligomer composed of said triazine and polyamine monomer, and polyamine monomer,
as a main component, with a polyfunctional crosslinking reagent having two or more functional groups capable of reacting with amino groups in the molecule, and a process for preparing the same.

9 Claims, No Drawings

COMPOSITE SEMIPERMEABLE MEMBRANE OF POLYAMINE AND TRIANZINE

This is a continuation of application Ser. No. 362,336, filed Mar. 26, 1982, now abandoned.

FIELD OF THE INVENTION

The present invention relates to a composite semipermeable membrane and a process for preparation thereof. In detail, it relates to a novel composite semipermeable membrane which is excellent in chemical resistance, heat resistance and compaction resistance in addition to possessing highly selective separation properties and water permeability and to a process for preparation of such a membrane.

BACKGROUND OF THE INVENTION

Hitherto, membranes composed of cellulose acetate have been well known as selective permeable membranes, such as reverse osmosis membranes or ultrafiltration membranes, etc., because of their basically excellent performance and ease of preparation. However, membranes composed of cellulose acetate have problems of hydrolysis by acids or alkalis, deterioration by bacteria, poor compaction properties, and the like. In order to avoid these problems, various selective permeable membranes using synthetic polymers have been proposed. These membranes are the so-called heterogeneous membranes or anisotropic membranes wherein a body having a dense surface layer having solute removability capability is supported on a porous layer composed of the same material. In many cases, though they are superior to cellulose acetate membranes with respect to hydrolysis resistance, bacteria decomposition resistance and/or heat resistance, such membranes still do not satisfy all of the fundamental performance requirements for selective separation, water permeability and still have insufficient durability, such as chemical resistance, heat resistance, bacteria decomposition resistance, compaction resistance, and the like. Therefore, the search for improved membranes has continued.

Recently, in order to solve such problems, various composite semipermeable membranes wherein a semipermeable dense ultrathin film is formed on a porous substrate have been proposed. Such composite semipermeable membranes are produced in general by a process which comprises applying an aqueous solution of a reactive material to a porous substrate and contacting it with a solution of a polyfunctional crosslinking reagent such as tolylenediisocyanate, isophthaloyl chloride or trimesic acid chloride, etc. in a water-immiscible organic solvent such as hexane to form a semipermeable dense layer by reaction of the reactive material with the crosslinking reagent at the interface between the water and the organic solvent. For example, a composite semipermeable membrane using polyethyleneimine (U.S. Pat. No. 4,039,440), a composite semipermeable membrane using epichlorohydrin modified with ethylenediamine (U.S. Pat. No. 4,005,012) and a composite semipermeable membrane using polyethylene imine modified with acrylonitrile (U.S. Pat. No. 3,951,815) as reactive materials have been known.

Such composite semipermeable membranes are excellent in fundamental performance of selective permeability and water-permeability as compared with the prior anisotropic membranes such as cellulose acetate membranes, and they are improved in durabilities such as chemical resistance, heat resistance, and the like. However, they have a problem in chlorine resistance, and also it has been desired to further improve their fundamental performance from the viewpoint of practicability and economics.

SUMMARY OF THE INVENTION

The present invention has been accomplished in order to overcome the above-described problems, and it is an object of the present invention to provide a practicable composite semipermeable membrane having excellent chemical resistance, excellent chlorine resistance and excellent heat resistance in addition to excellent selective separation properties and large water permeability, and a process for preparation of such a membrane.

The composite semipermeable membrane according to the present invention comprises a porous substrate and an ultrathin dense polymeric layer having solute removal properties formed on said substrate by crosslinking a reactive material composed of at least one material selected from the group consisting of (a) a mixture of triazine represented by the general formula:

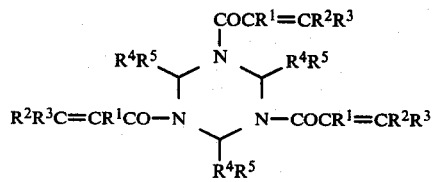

(wherein $R^1$, $R^2$, $R^3$, $R^4$ and $R^5$ each represents a hydrogen atom or an alkyl group having 1 to 5 carbon atoms) and polyamine monomer, (b) the above-described triazine modified with amine, (c) a mixture of the above-described triazine modified with amine and polyamine monomer, (d) an oligomer composed of the above-described triazine and polyamine monomer, and (e) a mixture of an oligomer composed of the above-described triazine and polyamine monomer and polyamine monomer, as a main component, with a polyfunctional crosslinking reagent having two or more functional groups in the molecule capable of reacting with amino groups. This composite semipermeable membrane is prepared by a process of the present invention which comprises coating or impregnating the porous substrate with a solution containing the above-described reactive material, thereafter contacting it with a polyfunctional crosslinking reagent capable of reacting with amino groups, and then heating the product.

DETAILED DESCRIPTION OF THE INVENTION

The triazine used in the present invention is represented by the following general formula:

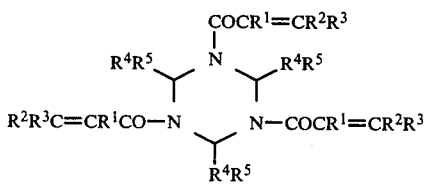

(I)

(wherein $R^1$, $R^2$, $R^3$, $R^4$ and $R^5$ each represents a hydrogen atom or an alkyl group having 1 to 5 carbon atoms, preferably a hydrogen atom and methyl group) (hereinafter "triazine (I)"). Examples of triazines of Formula I include hexahydro-1,3,5-triacryl-s-triazine, hexahydro-1,3,5-tricrotonyl-s-triazine, hexahydro-1,3,5-trimethacryl-s-triazine, 2,4,6-trihydro-2,4,6-trimethyl-1,3,5-triacryl-s-triazine, 2,4,6-trihydro-2,4,6-trimethyl-1,3,5-tricrotonyl-s-triazine and 2,4,6-trihydro-2,4,6-trimethyl-1,3,5-trimethacryl-s-triazine. Hexahydro-1,3,5-triacryl-s-triazine is particularly preferred.

The above-described triazine modified with amine as set forth in (b) above (hereinafter "triazine (II)") is easily obtained by adding primary or secondary amino compounds to active double bonds of the above-described triazine and is represented by the general formula (II):

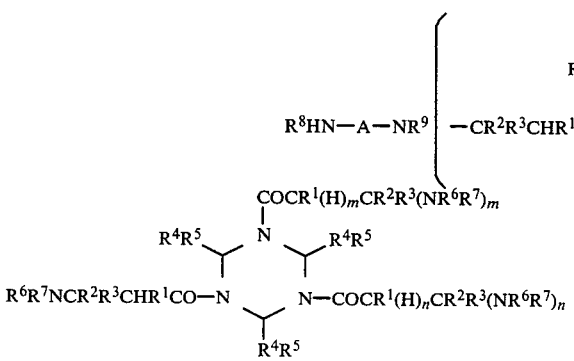

(II)

(wherein $R^1$ to $R^5$ each having the same meaning as described above with respect to Formula I, $R^6$ and $R^7$ each represents a hydrogen atom or an aliphatic, alicyclic or aromatic hydrocarbon group having 1 to 25 carbon atoms and, preferably, 2 to 13 carbon atoms, which may contain primary or secondary amino groups, or $R^7$ represents an aliphatic, alicyclic or aromatic hydrocarbon group having 1 to 25 carbon atoms and, preferably, 2 to 13 carbon atoms, containing primary or secondary amino groups, which may bond to $R^6$ when $R^6$ is not a hydrogen atom, and m and n each represents 0 or 1 but at least one of them is 1). More preferred examples for $R^6$ and $R^7$ are an unsaturated aliphatic hydrocarbon group having 1 to 6 carbon atoms, an alicyclic hydrocarbon group having 6 to 15 carbon atoms and an aromatic hydrocarbon group having 6 to 15 carbon atoms.

Accordingly, the amino compounds used for obtaining such triazine modified with amine or polyamine include aliphatic, alicyclic and aromatic primary amines having 1 to 25 carbon atoms and, preferably, 2 to 13 carbon atoms; aliphatic, alicyclic and aromatic polyamino compounds having 2 to 25 carbon atoms and two or more primary and/or secondary amino groups in the molecule, and ammonia. Examples of primary amines include methylamine, ethylamine, cyclohexylamine, aniline, benzylamine and 2-aminopyridine, etc. Examples of polyamino compounds include ethylenediamine, N,N'-dimethylethylenediamine, diethylenetriamine, triethylenetetramine, piperazine, 4-aminopiperidine, 4,4'-dipiperidyl, p-phenylenediamine, m-phenylenediamine, dipiperazylmethane, 1,3-dipiperazylpropane, 4,4'-dipiperizylmethane,1,3-dipiperizylpropane, 2,5-dimethyl-piperazine, homopiperazine, 1,4,7-triazacyclononane, 4,4'-diaminodiphenylmethane,4,4'-diaminodiphenylsulfone, 4,4'-diaminodiphenylether, 2,6-diaminopyridine, 2,4-diaminopyridine, 1,8-diaminonaphthalene and benzidine, etc.

The amine modified product (II) is obtained by a process which comprises dissolving triazine (I) and the above-described amino compound in tetrahydrofuran, dioxane, pyridine or water and reacting them at a temperature of 0°–150° C. for several minutes to several days and, preferably, at a room temperature to 90° C. for 30 minutes to 3 hours. Generally, the above-described amino compound is used in an amount of 5 to 100 mols, preferably 10 to 100 mols, per mol of double bond of triazine (I). The reaction is generally at atmospheric pressure.

The oligomer composed of the above-described triazine (I) and polyamine as set forth in (d) above (hereinafter "oligomer (III)") is represented by the following general formula (III):

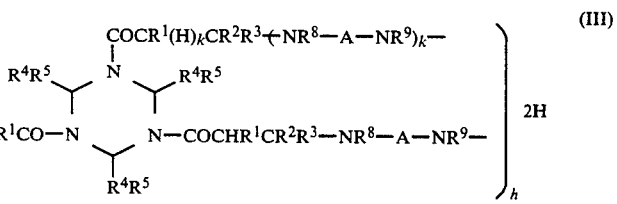

(III)

(wherein $R^1$ to $R^5$ each have the same meaning as described above with respect to Formula I, $R^8$ and $R^9$ each represents a hydrogen atom or an alkyl group having 1 to 5 carbon atoms and $R^8$ and $R^9$ may bond together, A represents an aliphatic, alicyclic or aromatic hydrocarbon group having 2 to 25 carbon atoms which may contain primary or secondary amino groups, k represents 0 or 1, and h represents an integer of 1 to 10). It is preferred that the oligomer has a solubility of at least 0.1 parts by weight to 100 parts by weight of water.

This oligomer is obtained by adding the desired polyamino compound, preferably dropwise, to a solution of triazine (I) in an amount of, generally, 1.5 to 10 mols per mol of the double bonds in the triazine to carry out the reaction. Namely, the acryl group in the above-described modified triazine (II) to which the polyamino compound is added bonds to a double bond of another triazine (I) or modified triazine (II) to form a dimer, and the resulting dimer bonds to another triazine or modified triazine to form an oligomer. Accordingly, when the polyamino compound is used in a greatly excess amount relative to the triazine (I), the reaction stops at formation of the amine modified triazine (II).

The polyamino compound for obtaining the oligomer may be suitably selected from the polyamino compounds previously described for synthesizing the amine modified triazines of group (b) above.

In the present invention at least one material selected from the group consisting of (a) a mixture of triazine (I) and polyamine monomer, (b) an amine modified triazine (II), (c) a mixture of amine modified triazine (II) and polyamine monomer, (d) an oligomer (III) composed of triazine (I) and polyamine monomer, and (e) a mixture of the above-described oligomer (III) and polyamine monomer is used as a main component of the reactive material. By reactive material is meant substances which react with polyfunctional crosslinking reagents as described herein.

The polyamine monomer constituting the above-described reactive material together with triazine (I), amine modified triazine (II) and oligomer (III) means aliphatic, alicyclic and aromatic polyamine compounds having 2 to 25 carbon atoms and two or more primary and/or secondary amino groups in the molecule. Examples of such polyamine monomers include the polyamino compounds used for obtaining the above-described amine modified triazines as described above. Specifically, there are aliphatic, alicyclic and aromatic polyamino compounds having 2 to 25 carbon atoms and two or more primary and/or secondary amino groups in the molecule. Examples of such polyamino compounds include ethylenediamine, N,N'-dimethyl-ethylenediamine, diethylenetriamine, triethylenetetramine, piperazine, 4-aminopiperidine, 4,4'-dipiperidyl, p-phenylenediamine, m-phenylenediamine, dipiperazylmethane, 1,3-dipiperazyl-propane, 4,4'-dipiperizylmethane, 1,3-dipiperizylpropane, 2,5-dimethylpiperazine, homopiperazine, 1,4,7-triazacyclononane, 4,4.-diaminodiphenylmethane, 4,4'-diaminodiphenylsulfone,, 4,4'-diaminodiphenylether, 2,6-diaminopyridine, 2,4-diamino-pyridine, 1,8-diaminonaphthalene and benzidine, etc. The polyamine monomer is used in an amount of 10 to 1000 parts by weight and, preferably 50 to 500 parts by weight based on 100 parts by weight of triazine (I), modified triazine (II) or oligomer (III).

As described above, the reaction of triazine (I) and polyamine monomer proceeds readily. Accordingly, in cases where the mixture of triazine (I) and polyamine monomer is used as the reactive material, an addition reaction of triazine with polyamine monomer sometimes occurs with the lapse of time and, consequently, modified triazine or oligomer is contained in the solution of the reactive material when the porous substrate is coated or impregnated with the solution of the reactive material, as described in the following. However, this occurrence is harmless insofar as the invention is concerned.

Further, in the present invention, a part of triazine (I) composing the above-described reactive material may be substituted by other triazines. For example, it is possible to substitute up to 30% by weight of triazine to be used by the following triazine represented by the general formula (IV) (hereinafter "triazine (IV)"):

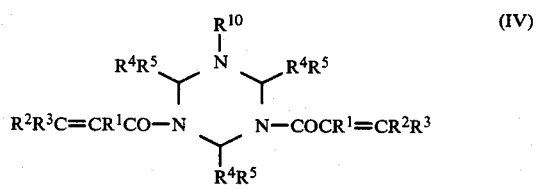

(wherein $R^1$ to $R^5$ each have the same meaning as described above, and $R^{10}$ represents an alkyl group having 1 to 5 carbon atoms). Here, examples of the alkyl group include methyl, ethyl, and propyl.

Further, in the present invention it is possible to substitute up to 10% by weight of triazine (I) composing the reactive material by the following triazine represented by the general formula (V) (hereinafter "triazine (V)"):

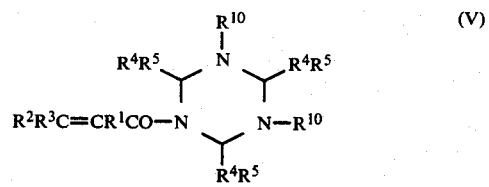

(wherein $R^1$ to $R^5$ each represents the same meaning as described above, and $R^{10}$ represents an alkyl group having 1 to 5 carbon atoms, respectively). Here, examples of the alkyl group include methyl, ethyl and propyl.

In case of substituting both kinds of triazines represented by the formulas (IV) and (V) for triazine (I), the sum total thereof is preferably in a range of up to 30% by weight of total triazine to be used, and the amount of triazine represented by the formula (V) is up to 10% by weight of the triazine to be used.

In the composite semipermeable membrane of the present invention the above-described reactive material is crosslinked using a polyfunctional crosslinking agent to form an ultrathin film on a porous substrate. The dense layer of such an ultrathin film is prepared by coating or impregnating the porous substrate with a solution of the reactive material, and thereafter contacting the substrate with a polyfunctional crosslinking reagent to polymerize the reactive material by crosslinking. An anisotropic ultrafiltration membrane having a dense layer can be used as the porous substrate; in this case the solution of the reactive material is generally applied to the dense layer side.

The solvent for preparing the solution of the reactive material (referred to as "raw solution," hereinafter) is preferably water. However, a solvent mixture composed of water and aliphatic alcohols having 1 to 3 carbon atoms may be used. The raw solution is prepared such that the concentration of the reactive material is from 0.05 to 15% by weight and, preferably, from 0.1 to 10% by weight. This raw solution may contain a surface active agent for reducing surface tension in case of coating or impregnating the porous substrate. Further, it may contain an agent for reacting with byproducts; for example, sodium hydroxide or aqueous ammonia may be used in the case that hydrochloric acid, and the like are produced as byproducts during crosslinking.

The porous substrate used in the present invention is suitably a membrane having an asymmetric structure wherein the surface pore diameter is generally from 50 to 5000 Å and the pure water flux after operation for 1 hour under a pressure of 3.5 Kg/cm² (referred to as membrane constant, hereinafter) is from $10^{-5}$ to 1 g/cm²-second-atmosphere and, preferably, from $10^{-4}$ to 0.1 g/cm²-second-atmosphere. For example, polysulfone, polyethersulfone, polyacrylonitrile, cellulose ester, polypropylene, polyvinyl chloride, polyvinylidene fluoride, polyimide and polyamideimide, etc. are preferably used. Further, the porous membrane may be reinforced by backing with cloth or a nonwoven web.

The process for producing the membrane having an asymmetric structure is disclosed, for example, in U.S. Pat. Nos. 3,526,588, 3,615,024 and 4,240,914.

The amount of the raw solution applied to the porous substrate is in a range from 0.05 to 5 g/m² and, preferably, from 0.1 to 1 g/m², calculated as solid content. If necessary, the amount of coating is controlled so as to be in the above-described range by an operation such as air drying, draining, or pressing by a rubber roll, etc. after application of the raw solution to the substrate.

The polyfunctional crosslinking reagent used in the present invention means a compound having two or more functional groups capable of reacting with primary amino groups and secondary amino groups, for example, one or more kinds of acid halide groups, isocyanate groups, halogenosulfonyl groups, N-haloformyl groups, haloformate groups, epoxy groups, aldehyde groups and acid anhydride groups, etc. in the molecule; the molecular weight of the reagent is generally 100 to 400 and, preferably, 150 to 300. Preferred examples include isophthaloyl chloride, terephthaloyl chloride, trimesic acid trichloride, trimellitic acid trichloride, trimellitic acid chloride anhydride, 1,3-benzenedisulfonyl dichloride, dipicolinic acid dichloride, 5-chlorosulfonyl isophthaloyl chloride, piperazine-N,N'-dicarboxylic acid dichloride, tolylenediisocyanate, m-xylylenediisocyanate, 4,4'-diphenylether diisocyanate, 4,4'-diphenylmethane diisocyanate, cyclohexanediisocyanate and dimethyldiisocyanate adamantane, etc.

As one process for contacting the coated layer of the raw solution containing the reactive material with the above-described polyfunctional crosslinking reagent, it is possible to dissolve the crosslinking reagent in an organic solvent which is immiscible with the solvent used for preparing the described raw solution and contact the coated layer with the resulting crosslinking reagent solution; another process comprises contacting the coated layer with a vapor of the crosslinking reagent.

In the process which comprises contacting the coated layer with the crosslinking reagent solution, it is necessary that the solvent for the crosslinking reagent does not dissolve or swell the porous substrate. Preferably, hydrocarbon solvents having a solubility parameter of 7.0 to 9.0 are used. More preferably, aliphatic and alicyclic hydrocarbons having 5 to 8 carbon atoms are used, examples of which include pentane, hexane, heptane, octane, cyclopentane, cyclohexane and petroleum ether, etc. In addition, trichlorotrifluoroethane is a suitable solvent. The crosslinking reagent solution generally has a concentration of from 0.05 to 10% by weight and, preferably, 0.1 to 5% by weight of crosslinking reagent. The temperature and time of contacting the crosslinking reagent with the raw solution coated layer can vary, according to the kind and concentration of the crosslinking reagent, concentration of the raw solution and the kind of the polyamine monomer, etc., but contacting typically is carried out at from 10° to 60° C., for example, for from 10 seconds to 10 minutes and, preferably, from 30 seconds to 5 minutes at room temperature.

In the case of using the vapor of the crosslinking reagent, the vapor pressure of the crosslinking reagent in the vapor atmosphere is generally 0.1 mmHg or more and, preferably, 0.2 mmHg or more at a temperature of less than 100° C., though it depends upon the kind of the crosslinking reagent to be used and the contacting temperature. The contacting temperature is generally from 5° C. to 90° C. and, preferably, from 20° C. to 70° C., and the contacting time is from 0.1 seconds to 30 minutes and, preferably, from 1 second to 5 minutes.

In this process in order to carry out crosslinking effectively to obtain a composite semipermeable membrane having a good performance, the contacting time and the vapor pressure in the present invention are preferably selected such that the "V log T" value wherein V (mm Hg) is vapor pressure of the crosslinking reagent at the contacting temperature and T (second) is the contacting time, is preferably at least 0.1 and, particularly, at least 0.3. There is no upper limit required for the V log T value, but it is generally 1000 or less.

Further, gases which do not participate in the crosslinking reaction, such as air, nitrogen, carbon dioxide, Fluron or inert gas, etc. may be present in the case of contacting the raw solution coated layer with the vapor of the crosslinking reagent.

In the present invention when the raw solution coated layer on the porous substrate is brought into contact with the crosslinking agent solution or with the vapor of the crosslinking reagent, a semipermeable dense ultrathin film is formed on the substrate.

According to the process of the present invention, primary and/or secondary amino groups in the reactive material with which the porous substrate is coated or impregnated cause addition reactions and/or condensation reactions with the polyfunctional crosslinking reagent and double bonds remaining in the reactive material cause addition reactions with primary and/or secondary amino groups in the polyamine monomer, the modified triazine (II) or the oligomer (III), etc. and/or cause polymerization reactions by heating, and consequently a highly crosslinked dense layer is formed on the porous substrate.

The thickness of the dense ultrathin film, which depends upon the concentration of the reactive material in the raw solution or of the crosslinking reagent solution and the contacting time of the reactive material with the crosslinking reagent, is generally from 50 to 10,000 Å and, preferably, from 100 to 5,000 Å. If the ultrathin film is too thin, the film surface has partial defects. On the other hand, if it is too thick, the water permeability deteriorates.

The porous substrate, coated or impregnated with the raw solution and thereafter brought into contact with the crosslinking reagent, as described above, is generally subjected to heat treatment in order to sufficiently carry out the crosslinking. The heating temperature is from 80° to 180° C., and preferably from 100° to 150° C., and the heating time is from 1 to 60 minutes, and preferably from 5 to 30 minutes.

According to the present invention, a composite semipermeable membrane having remarkably high selective permeability and also excellent durability such as heat resistance, chlorine resistance, acid resistance or alkali resistance, etc., can be obtained by selecting the reactive material and the polyfunctional crosslinking reagent, as described above and in the following examples.

Below, the present invention is illustrated by references to specific examples. However, it will be recognized that the invention is not limited thereto. In these examples, "rejection" means a value calculated by the following formula:

$$\text{Rejection (\%)} = \left(1 - \frac{\text{Salt concentration in permeated solution}}{\text{Salt concentration in feed solution}}\right) \times 100$$

EXAMPLE 1

An aqueous solution containing 1.0% by weight of hexahydro-1,3,5-triacryl-s-triazine and 2.5% by weight of piperazine was applied uniformly to a dense layer on a porous substrate (membrane constant: $1.02 \times 10^{-2}$ g/cm$^2$-second-atmosphere) composed of polysulfone (P-3500, produced by Union Carbide Co.); the substrate then was immersed in a solution containing 1.0% by weight of 2,4-tolylenediisocyanate in n-hexane at a temperature of 25° C. for 1 minute. The substrate was taken out of the solution to volatilize n-hexane on the membrane surface and subjected to heat treatment at 130° C. for 10 minutes.

When a reverse osmosis test was carried out by supplying a 5000 ppm aqueous solution of sodium chloride to the resulting composite semipermeable membrane at a temperature of 25° C. under a pressure of 42 Kg/cm$^2$, the water flux after 24 hours was 0.64 m$^3$/m$^2$/day and the rejection was 99.2%. When continuous operation was carried out subsequently for 200 hours, the performance of the membrane did not deteriorate.

EXAMPLES 2–6

Composite semipermeable membranes were obtained by the same procedure as in Example 1, except that polyamine monomers shown in Table 1 below were used instead of piperazine. The reverse osmosis performances of these composite semipermeable membranes measured under the same conditions as in Example 1 are shown in Table 1.

TABLE 1

| Example | Polyamine monomer | Water Flux (m$^3$/m$^2$/day) | Rejection (%) |
|---|---|---|---|
| 2 | Ethylenediamine | 0.31 | 99.0 |
| 3 | m-Phenylenediamine | 0.47 | 99.3 |
| 4 | Homopiperazine | 0.50 | 99.2 |
| 5 | 2,5-Dimethylpiperazine | 0.40 | 98.7 |
| 6 | 4-Aminopiperizine | 0.70 | 99.1 |

EXAMPLE 7

A composite semipermeable membrane was obtained by the same procedure as in Example 1, except that a water/methanol (½) mixed solvent was used instead of water and 4,4'-diaminodiphenylsulfone was used instead of piperazine. When the reverse osmosis performance of this composite semipermeable membrane was measured under the same conditions as in Example 1, the water flux was 0.50 m$^3$/m$^2$/day and the rejection was 99.5%.

EXAMPLES 8–10

Composite semipermeable membranes were obtained by the same procedure as in Example 1, except that crosslinking reagents shown in Table 2 were used instead of 2,4-tolylenediisocyanate. The reverse osmosis performances of these composite semipermeable membranes measured under the same condition as in Example 1 are as shown in Table 2.

TABLE 2

| Example | Crosslinking Reagent | Water Flux (m$^3$/m$^2$/day) | Rejection (%) |
|---|---|---|---|
| 8 | 1.0 wt. % of isophthaloyl chloride | 0.78 | 99.0 |
| 9 | 0.5 wt. % of trimesic acid chloride | 2.78 | 90.2 |
| 10 | 1.0 wt. % of isophthaloyl chloride/trimesic acid chloride (3/1) | 2.03 | 95.8 |

EXAMPLE 11

A composite semipermeable membrane was obtained by the same procedure as in Example 1, except that instead of using the solution of 2,4-tolylenediisocyanate crosslinking was accomplished by using a vapor of 2,4-tolylenediisocyanate under such a condition that the value VT was 0.4. When the reverse osmosis performance of this composite semipermeable membrane was measured under the same conditions as in Example 1, the water flux was 0.87 m$^3$/m$^2$/day and the rejection was 99.3%.

EXAMPLE 12

300 ml of a solution containing 10% by weight of hexahydro-1,3,5-triacryl-s-triazine in pyridine was dropwise added to 500 ml of ethylenediamine over 3 hours. After conclusion of the reaction, the solvent and unreacted ethylenediamine were removed under reduced pressure to obtain ethylenediamine modified hexahydro-1,3,5-triacryl-s-triazine in a stoichiometric yield. The structure was confirmed by infrared absorption spectrum, nuclear magnetic resonance spectrum and GPC.

After an aqueous solution containing 1.0% weight of the above-described ethylenediamine modified triazine was uniformly applied to a dense layer on polysulfone porous substrate of the same type as that in Example 1, the substrate was processed with a solution containing 1.0% by weight of 2,4-tolylenediisocyanate in n-hexane by the same procedure as in Example 1. When the reverse osmosis performance of this composite semipermeable membrane was measured under the same conditions as in Example 1, the water flux was 0.43 m$^3$/m$^2$/day and the rejection was 99.1%.

EXAMPLE 13

A composite semipermeable membrane was obtained by the same procedure as in Example 1, except that an aqueous solution containing 1% by weight of ethylenediamine modified triazine obtained in Example 12 and 2.5% by weight of piperazine was used as the solution of reactive material and a solution containing 1.0% by weight of isophthaloyl chloride in n-hexane was used as the crosslinking reagent. When the reverse osmosis performance of this composite semipermeable membrane was measured under the same conditions as in Example 1, the water flux was 0.70 m$^3$/m$^2$/day and the rejection was 99.2%.

EXAMPLE 14

To 500 ml of an aqueous solution containing 10% by weight of hexahydro-1,3,5-triacryl-s-triazine heated to 80° C., 300 ml of an aqueous solution containing 10% by weight of piperazine was rapidly added at the same temperature. After stirring for 1 hour at the same temperature, the mixture was cooled to room temperature and water was added to make 5 liters. Water insoluble materials were removed by filtration to obtain an aqueous solution of hexahydro-1,3,5-triacryl-s-triazinepiperanine oligomer. When this aqueous solution was analyzed by GPC, unreacted monomers were not contained and the average degree of polymerization was 2.

A composite semipermeable membrane was obtained by the same procedure as in Example 1, except that the above-described aqueous solution was used as the raw solution. When the reverse osmosis performance of this composite semipermeable membrane was measured under the same conditions as in Example 1, the water flux was 0.60 m³/m²/day and the rejection was 99.0%.

EXAMPLE 15

To an aqueous solution of the oligomer obtained in Example 14, 4-aminopiperizine was added so as to be 3.0% by weight. Using the resulting raw solution, a composite semipermeable membrane was obtained by the same procedure as in Example 1. When the reverse osmosis performance of this complex semipermeable membrane was measured under the same conditions as in Example 1, the water flux was 0.58 m³/m²/day and the rejection was 99.0%.

EXAMPLE 16

In this example, chlorine resistance, heat resistance, acid resistance and alkali resistance of the composite semipermeable membranes of the present invention were evaluated.

Chlorine resistance

A 5,000 ppm solution of sodium chloride containing 5 ppm of chlorine was continuously supplied to the composite semipermeable membrane obtained in Example 8 at a temperature of 25° C. under a pressure of 42 Kg/cm². The initial water flux was 0.71 m³/m²/day and the rejection of 99.2% did not change after 150 hours.

Heat resistance

The composite semipermeable membrane obtained in Example 1 was immersed in a hot bath at 60° C. for 1 month. After immersion, the reverse osmosis performance thereof was measured under the same conditions as in Example 1. The water flux was 0.68 m³/m²/day and the rejection was 99.3%, which were the same as those before the immersion.

Alkali resistance

The composite semipermeable membrane obtained in Example 1 was immersed in a solution having pH 11 at a room temperature for 1 month. After immersion, the reverse osmosis performance thereof was measured under the same conditions as in Example 1. The water flux was 0.67 m³/m²/day and the rejection was 99.4%, which were the same as those before the immersion.

Acid resistance

The composite semipermeable membrane obtained in Example 8 was immersed in a solution having pH 3 at a room temperature for 1 month. After immersion, the reverse osmosis performance thereof was measured under the same conditions as in Example 1. The water flux was 0.65 m³/m²/day and the rejection was 99.0%, which were the same as those before the immersion.

What is claimed is:

1. A composite semipermeable membrane which comprises a porous substrate and an ultrathin dense layer having solute removal structure positioned on said substrate, said ultrathin dense layer consisting essentially of (1) an oligomer composed of polyamine monomer and triazine represented by the general formula:

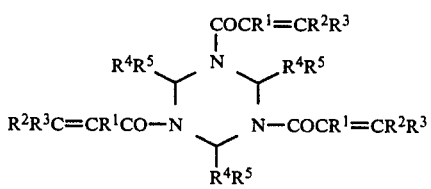

wherein $R^1$, $R^2$, $R^3$, $R^4$ and $R^5$ each represent a hydrogen atom or an alkyl group having 1 to 5 carbon atoms crosslinked with (2) polyamine monomer, as a main component, and with a polyfunctional crosslinking reagent having two or more functional groups capable of reacting with amino groups in oligomer molecules.

2. A composite semipermeable membrane according to claim 1, wherein said polyamine monomer of (2) is an aliphatic, alicyclic or aromatic polyamine having 2 to 25 carbon atoms and having two or more primary or secondary amino groups in each molecule.

3. A composite semipermeable membrane according to claim 1, wherein said polyfunctional crosslinking reagent is a compound having two or more functional groups selected from acid halide groups, acid anhydride groups, isocyanate groups, halogenosulfonyl groups, haloformate groups and N-haloformyl groups.

4. A composite semipermeable membrane according to claim 1, wherein said porous substrate is a porous membrane composed of polysulfone, polyether sulfone, cellulose ester, polypropylene, polyacrylonitrile, polyvinyl chloride, polyvinylidene fluoride, polyimide or polyamide imide.

5. A composite semipermeable membrane according to claim 1, wherein said porous substrate defines an asymmetric structure defining surface pore diameters of from 50 to 5000 Å and a pure water flux after one hour at a pressure of 3.5 Kg/cm² of from $10^{-5}$ to 1 g/cm²-second-atmosphere.

6. A composite semipermeable membrane according to claim 1, wherein said ultrathin dense layer defines a thickness of from 50 to 10,000 Å.

7. A composite semipermeable membrane according to any one of claims 1–6, wherein said oligomer composed of said triazine and polyamine monomer has the general formula:

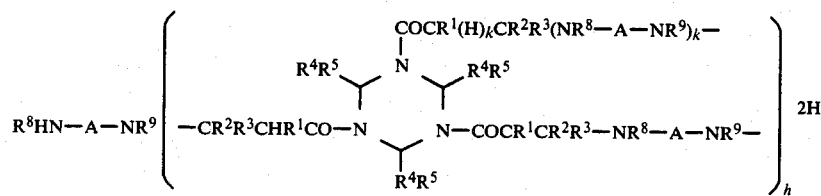

wherein $R^1$ to $R^5$ each represents a hydrogen atom or an alkyl group having 1 to 5 carbon atoms, $R^8$ and $R^9$ each represents a hydrogen atom or an alkyl group having 1 to 5 carbon atoms and $R^8$ and $R^9$ may bond together, A represents an aliphatic, alicyclic or aromatic hydrocarbon group having 2 to 25 carbon atoms which may contain primary or secondary amino groups, k represents 0 to 1, and h represents an integer of 1 to 10.

8. The composite semipermeable membrane of claim 1, wherein said polyamine monomer of (2) is present in an amount of 10 to 1,000 parts by weight based on 100 parts by weight of said oligomer.

9. The composite semipermeable membrane of claim 1, wherein said porous substrate is an anisotropic ultrafiltration membrane having a dense layer and said ultrathin dense layer is formed on the dense layer.

* * * * *